Patented Aug. 7, 1945

2,381,473

UNITED STATES PATENT OFFICE 2,381,473

CATALYST

John W. Teter, Chicago, Ill., assignor to Sinclair Refining Company, New York, N. Y., a corporation of Maine No Drawing. Application May 29, 1943, Serial No. 489,087

4 Claims. (Cl. 260—464)

This invention relates to the catalytic amination of olefinic hydrocarbons and more particularly to improvements in such amination operations especially with respect to the catalyst employed.

The production of amines and nitriles by the catalytic amination of olefinic hydrocarbons has been found to be an especially promising and valuable source of such materials for use in the synthesis of various compounds including the production of synthetic rubber and other nitrogen-containing materials. Various catalysts have been used successfully in such amination operations. However, cobalt has been found to be especially effective. Generally, the amination is effected by bringing an admixture of hydrocarbon and ammonia into contact with the catalyst at an elevated temperature and pressure.

Heretofore, in the catalytic amination of olefinic hydrocarbons with ammonia, the desired amination reaction has invariably been accompanied by a plurality of competing side reactions, including polymerization, and cracking of the hydrocarbon, which tend to reduce materially the yield of the desired nitrogen-containing compound. Catalysts comprising cobalt suspended on a suitable carrier have been found to be particularly effective in selectively catalyzing the desired amination reaction and relatively repressing the undesirable competing side reactions.

After a period of operation the catalyst has been found to lose its selectivity to a greater or less extent and is reactivated by treatment with hydrogen at an elevated temperature. After continued use with intermittent reactivation, the catalyst becomes contaminated with carbon to such an extent that regeneration by burning off the carbon and subsequently reducing the catalyst, as by treating with hydrogen, becomes necessary.

An advantageous method of carrying out the amination operation involves the use of the catalyst in the form of pellets and passing the olefin-ammonia mixture through a bed of the pelleted catalyst. Periodically the passage of the admixture through the catalyst is discontinued, the reaction chamber drained and purged and the catalyst reactivated or regenerated in situ or the catalyst may be removed from the reaction chamber to another vessel for reactivation or regeneration and subsequently returned to the reactor for further use.

In such operations the uniform flow of the olefin-ammonia mixture and of the reactivating hydrogen through the catalyst is materially interfered with by any substantial disintegration of the catalyst pellets. Accordingly, it is highly desirable that such disintegration be avoided so far as possible.

My research experience in this field indicates that the tendency of the catalyst to disintegrate is closely associated with the extent of carbon deposition on the catalyst. This carbon deposit results from the competitive cracking reaction which not only tends to decrease the yield of the desired product but fouls the catalyst and, if permitted to proceed to too great an extent, results in a binding together of the catalyst bed so as to interfere with the uniformity of flow of the reactants and reactivating gases therethrough and makes difficult the removal of the catalyst from the reactor.

My present invention provides improvements in the amination of olefinic hydrocarbons whereby many of the difficulties heretofore experienced are avoided or materially reduced. Briefly, my invention provides an improved process whereby olefinic hydrocarbons are reacted with ammonia in the presence of a catalyst comprising cobalt suspended on a suitable carrier and promoted by the presence of manganous oxide.

In accordance with my improved process, the objectionable side reactions are materially repressed and the uniformity of operation and the useful life of the catalyst substantially improved. For example the rate of polymerization of the olefins is materially reduced. Further, the rate at which products of cracking reactions are formed and the rate at which carbon is deposited on the catalyst are substantially reduced. Also, the rate of disintegration of the catalyst is materially reduced, the uniformity of the operation promoted and the useful life of the catalyst prolonged.

In addition to the foregoing, the amination product itself is favorably effected. For instance, propionitrile, an important intermediate product used in the synthesis of rubber and other vital materials, has been successfully prepared by the amination of propylene using a suspended cobalt catalyst. Along with the propionitrile, other valuable nitrogen-containing compounds, for instance acetonitrile, normal butyronitrile, isobutyronitrile and substantial proportions of unidentified nitrogen compounds, are produced. These nitriles would normally be satisfactorily separated by fractional distillation. However, the nitrile fractions are usually contaminated by polymerization products boiling within the range of the respective nitriles and accordingly are not readily separated therefrom.

In accordance with my improved process, the production of such contaminants is materially reduced and, consequently, substantially pure nitrile products may be obtained by fractionation without resort to complicated separation procedure.

In the preparation of a catalyst used in accordance with my present invention, various known carriers may be used. For example, I have used with particular advantage diatomaceous silica consisting essentially of the silica remains of diatoms of the type which has been classified as marine plankton diatoms and containing a minor proportion of $Al_2O_3$, more fully described in my co-pending application Serial No. 444,095, filed May 22, 1942, such as currently sold under the tradename "Snow Floss." One may also use a hydrated magnesium silicate, preferably a synthetic magnesium silicate of high purity such as is more fully described in my co-pending application Serial No. 444,096, filed May 22, 1942, and which is currently marketed under the tradename "Magnesol" or an acid-treated bentonite clay which has been subjected to a subsequent heat-treatment, as more fully described in my co-pending application Serial No. 444,097, filed May 22, 1942, and which is currently marketed under the tradename "Super-Filtrol." However, I have found the diatomaceous silica such as sold under the tradename "Snow Floss" to be especially suited for the purpose of my present invention.

A particularly advantageous catalyst for use in accordance with my present invention, comprising my manganous oxide promoter, may be prepared as follows: There is dissolved in 10 gallons of distilled water, 6360 grams, approximately 25.5 moles, of cobalt acetate tetrahydrate. The solution is then filtered and there is added to the filtrate 1500 grams of "Snow Floss" and the mixture stirred vigorously for about one hour. 3300 grams, approximately 31.2 moles, of anhydrous CP sodium carbonate is dissolved in 7 gallons of distilled water and the resultant solution added to the cobalt solution as a precipitant. This addition is carried out at such a rate that about half of the carbonate solution is added over a period of about one hour. The stirring is then continued for about half an hour and the remaining carbonate solution added in a similar manner. The resulting slurry is then stirred for about an hour and allowed to stand over night.

Thereafter, the solid material is washed by means of a filtration and stirring process. In this washing operation, the thin slurry is filtered and the filtercake reslurried in about 10 to 15 gallons of distilled water. The resultant slurry is then filtered and the washing operation thus continued until the sodium ion concentration in the catalyst has been reduced to the desired extent, preferably not to exceed about 0.1% of sodium based on the weight of the complete catalyst.

After the washing operation has been completed, the filtercake is slurried thoroughly in about 5 gallons of distilled water and to this slurry there is added about 5 gallons of water in which there has been dissolved 103.5 grams of manganous acetate tetrahydrate, the equivalent of 30 grams of MnO. Thereafter, the mixture is stirred for about 6 hours and filtered. The cake is dried in a steam chest for about 48 hours at a temperature of about 280° F., then broken up to pass an 8-mesh screen, calcined for about 24 hours at approximately 600° F, then ground and screened to a mesh of 30 and upwards. The catalyst is then pelleted, for instance, with the addition of 2% stearic acid and 4% starch and dried in a stream of nitrogen at a temperature of about 700°. The pelleted catalyst suspension is then reduced by passing hydrogen in contact with the mass at a temperature of 650–750° F. for a period of about 12 hours or more and is ready for use.

The catalyst thus produced will be found to contain about 50% of the cobalt catalyst and about 1% of the manganous oxide promoter suspended on the carrier. These proportions may be varied over a considerable range but I have found about 50% cobalt and about 1% manganous oxide to be generally satisfactory.

The advantages derived from the use of the manganous oxide promoter, in accordance with my present invention, will be specifically illustrated by reference to four catalytic amination operations carried out under comparable conditions. In each of these operations the catalyst employed comprised cobalt suspended on "Snow Floss," prepared substantially as previously described except that in the preparation of the catalysts used in two of the operations the manganous oxide promoter was omitted. The respective catalyst and the operations in which they were employed will be identified herein as A, B, C and D. Each catalyst contains about 50% cobalt. Catalysts A and B contain no manganous oxide while C and D contain about 1.22% manganous oxide. In catalysts C and D the residuum sodium was about 0.25%. Each catalyst was pelleted using a binder of stearic acid and starch as previously described.

In the respective operations identical apparatus was used. An equal volume of the catalyst was placed in a reaction chamber maintained under a pressure of about 3000 pounds per square inch and at a temperature of about 700° F. Carefully controlled amounts of an olefin mixture and anhydrous ammonia were passed together in contact with the catalyst in the reaction chamber for a period of 12 hours. Thereafter, the feed of the reactants was discontinued, the chamber purged and the catalyst therein reactivated by passing hydrogen in contact with the catalyst at a temperature of 650–750° F., for a period of 12 hours, the chamber purged of hydrogen and the amination resumed for a period of 12 hours, after which the catalyst was again reactivated and the alternate amination operation and reactivation repeated for the total periods of amination operation hereinafter indicated.

The products of the reaction and any unreacted materials were passed from the reaction chamber to a stabilizer and the separated materials analyzed. In each operation, the composition of the feed, the feed rates, proportions of olefin to ammonia and space velocities, i. e. volume of liquid per volume of catalyst per hour, were comparable.

In each of these illustrative operations, the charging stock consisted of anhydrous ammonia and a refinery olefin mixture comprising about 35% by volume of olefins, predominantly propylene.

The percentage of reduced cobalt, crushing strength, apparent density and extent of reduction of the respective catalyst were as follows, the extent of reduction being indicated by the relative amounts of water formed during the reduction:

|  | A | B | C | D |
|---|---|---|---|---|
| Percentage of reduced cobalt | 48.6 | 48.6 | 51.1 | 51.1 |
| Crushing strength, lbs./sq. in | 8.0 | 6.5 | 8.3 | 7.4 |
| Apparent density | 1.045 | 1.15 | 1.046 | 1.013 |
| Reduction: |  |  |  |  |
| Grams $H_2O$ evolved | 50.9 | 75.4 | 65.5 | 53.8 |
| Mols $H_2O$/mol metal | .371 | .50 | .456 | .387 |

In the foregoing tabulation the values given for percentage of reduced cobalt were arrived at by dividing the percentage of metal found by analysis by the percentage of metal plus the percentage of the support, each by weight, the percentage of support being taken as 100%—

$$\left(\% \text{ metal found} \times \frac{\% \text{ metal oxide}}{\% \text{ metal}}\right)$$

The total hours of amination operation and the weight percent of sulfur and of carbon deposited on the catalyst during the respective total operating periods were as follows:

|  | A | B | C | D |
|---|---|---|---|---|
| Total hours of operation | 197 | 144 | 96 | 156 |
| Weight per cent sulfur on cat | 0.02 | 0.01 | 0.03 | 0.01 |
| Weight per cent carbon on cat | 12.36 | 12.52 | 3.2 | 8.09 |

Thus, it appears that, in the use of catalyst B and D over comparable periods, the amounts of sulfur contamination were equal but the amount of carbon deposited on D, the cobalt catalyst promoted by manganous oxide, was only about 65% that deposited on the catalyst B, the unpromoted cobalt catalyst.

In the operations in which catalysts A and B were used, the catalyst packed so severely in the reaction chamber that it was necessary to use a drill to remove it from the chamber at the end of the indicated period of operation. The catalysts C and D were much more readily removed from the reaction chamber.

Though, in the use of each of these catalysts some disintegration of the pellets was experienced, the disintegration of the pellets of catalysts C and D, which contained the manganous oxide promoter, was very much less than that in the case of the unpromoted catalysts, A and B. The reduction in disintegration of the pellets together with the much slower rate of carbon deposition are indicative of a reduction in the rate of cracking.

Evidence of the correlation of carbon deposition upon the catalyst and disintegration of the catalyst appears from a consideration of results obtained using the two promoted catalysts C and D. Catalyst C was in operation about 60% as long as catalyst D but thereafter the catalyst C was found to contain only about 40% as much carbon as catalyst D. This is reflected in the amount of disintegration.

At the end of the operation catalyst C was removed from the reaction chamber with a minimum of difficulty and was found to contain only about 20% by weight of fines. Catalyst D was less easily removed and contained about 50% fines. These results indicated that cracking with consequent carbon deposition is an important factor in catalyst life. Consequently, a repression of the competitive cracking reaction not only avoids loss of valuable reactants but prolongs the useful life of the catalyst, thus having a dual influence upon the yield of the desired nitrogen product from a given operation.

As previously noted, disintegration of the catalyst increases the resistance of the catalyst bed to flow of the reactants and the reactivating hydrogen therethrough. In this illustrative series of operations, disintegration of the catalyst was closely observed by measuring the resistance of the flow of hydrogen through the catalytic bed following each intermittent reactivating period. This was done by increasing the rate of hydrogen flow through the bed to five cubic feet per hour and holding this rate constant while measuring the pressure drop through the reactor. By a comparison of this back pressure with the back pressure through freshly reduced catalyst, a reliable indication of the physical character of the catalyst at any particular time was obtained.

Under these comparable operating conditions, catalysts A and B each showed a decided back pressure increase, indicating material disintegration, after about 40 to 50 hours of total amination operation. The back pressure of catalyst C was quite normal after 96 hours of operation and catalyst D remained in use a total of 120 hours before the resistance to hydrogen flow began to show any appreciable increase. These back pressure measurements reliably show that the total processing time before any serious disintegration of the catalyst is experienced is about twice as long where manganous oxide-promoted catalyst is employed as it is for the unpromoted catalyst.

The prolongation of the useful life of the catalyst is a highly beneficial attribute of my present invention. However, in addition thereto, the purity of the product is materially improved.

The advantages obtained by the use of my invention with respect to the production of propionitrile and the repression of polymerization appear from the following tabulated results derived from analysis of the products. The values presented are average values taken for the first eight amination periods of each of the four illustrative operations. The percentages of propionitrile and of polymers produced and the ratio of polymers to total nitrogen fixation are based on the amount of olefins charged.

|  | A | B | C | D |
|---|---|---|---|---|
| $C{\equiv}N$ produced ...... percent | 22.1 | 20 | 20.4 | 22.7 |
| Polymers produced ...... do | 5.2 | 4 | 2.5 | 3 |
| Polymers/N-fixation ...... do | 23.3 | 20 | 11.7 | 13.2 |

The advantages of my invention, particularly with respect to the repression of cracking, further appears from the following tabulation showing the way in which the olefin was consumed. These are likewise average values and were derived from analyses of the product and of the effluent gases.

| Olefin, wt. percent consumed | A | B | C | D |
|---|---|---|---|---|
| Unreacted | 17.5 | 22.8 | 11.8 | 11.1 |
| To paraffin | 50.9 | 46.0 | 62.1 | 65.0 |
| To nitrogen product | 21.7 | 17.9 | 16.9 | 19.3 |
| Cracked | 10.0 | 11.3 | 6.5 | 4.4 |
| Unaccounted for | 0.1 | 2.0 | 2.7 | 0.2 |

As to total nitrogen fixation, the manganous oxide-promoted catalyst such as C and D have been generally found to be as active as the unpromoted cobalt catalyst, usually slightly more active. However, in the use of the manganous oxide-promoted cobalt catalyst, only 50% to 60% as much polymer is produced as is produced by the unpromoted catalyst. Similarly, by the use of the manganous oxide promoter, the average amount of olefin cracked is only about half that where the unpromoted cobalt catalyst is used.

In using the manganous-oxide-promoted catalyst, the amount of hydrogenation obtained has generally been found to be somewhat increased over that resulting from the use of the unpromoted cobalt catalyst. However, the advantages of decreased polymerization and cracking far outweigh the disadvantages of increased hydrogenation, as the product of the latter reaction does not remain as a contaminant in the stabilized product whereas the products of polymerization do so remain. This increased selectivity resulting in a lower rate of polymer formation is especially important with respect to the purity of the product obtained by fractionation.

A composite sample of the product obtained in accordance with my improved process and of the product obtained under comparable conditions, except that the unpromoted cobalt catalyst was used, were subjected to fractionation in a one-inch Stedman column and it was found that the product produced using my manganous oxide promoter contained 127% as much acetonitrile, 103% as much propionitrile, 88% as much isobutyronitrile and 95% as much normal butyronitrile as was obtained in the product produced using the unpromoted catalyst. The acetonitrile fraction obtained from the manganous oxide-promoted operation was especially pure compared with that obtained using the unpromoted catalyst, which illustrates that the formation of hydrocarbons in this boiling range is minimized by the promoted catalyst. The ratio of propionitrile to total nitriles present was about 33% in each composite sample. However, in the product resulting from the promoted catalyst, about 15% of the total nitrogen of the stabilized product has been found to be present in fractions of boiling ranges above that of butyronitrile.

It will be understood that the invention is generally applicable to the catalytic amination of olefins by treatment with ammonia in the presence of a suspended cobalt catalyst under elevated temperatures and pressures, and is not limited to the particular operating conditions used herein in the specific illustrations. Temperatures somewhat lower than that used in the illustrative operations, for example 650° F., have been used with excellent results. Also, higher and still lower temperatures may be employed with advantage. The pressure may also be varied over a considerable range.

The invention has been found particularly applicable to the amination of propylene for the production of propionitrile and nitriles containing 2, 4 or more carbon atoms. Of the 3 carbon atom nitrogen compounds produced in the amination of propylene, propionitrile predominates. However, minor proportions, of the order of about 5%, of isopropyl amine has been found to be present in the product.

I claim:

1. In the production of organic compounds containing nitrogen wherein an olefinic hydrocarbon is reacted with ammonia at an elevated temperature and pressure in the presence of a catalyst comprising cobalt suspended on a carrier, the improvement which comprises promoting the suspended cobalt catalyst by the presence of manganous oxide.

2. In the production of organic compounds containing nitrogen wherein propylene is reacted with ammonia at an elevated temperature and pressure in the presence of a catalyst comprising cobalt suspended on a carrier, the improvement which comprises promoting the suspended cobalt catalyst by the presence of manganous oxide.

3. In the production of organic compounds containing nitrogen wherein olefinic hydrocarbon is reacted with ammonia at an elevated temperature and pressure in the presence of a catalyst comprising about 50% cobalt suspended on a diatomaceous silica catalyst, the improvement which comprises promoting the suspended cobalt catalyst by the presence of about 1% manganous oxide, the percentages of cobalt and manganous oxide being based on the total weight of catalyst.

4. In the production of organic compounds containing nitrogen wherein propylene is reacted with ammonia at an elevated temperature and pressure in the presence of a catalyst comprising about 50% cobalt suspended on a diatomaceous silica catalyst, the improvement which comprises promoting the suspended cobalt catalyst by the presence of about 1% manganous oxide, the percentages of cobalt and manganous oxide being based on the total weight of catalyst.

JOHN W. TETER.